(12) United States Patent
Knowles

(10) Patent No.: US 8,863,926 B2
(45) Date of Patent: Oct. 21, 2014

(54) INTEGRATED STARTER GENERATOR AND INPUT CLUTCH ASSEMBLY FOR HYBRID ELECTRIC VEHICLE

(75) Inventor: Shaun G. Knowles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1554 days.

(21) Appl. No.: 11/823,956

(22) Filed: Jun. 29, 2007

(65) Prior Publication Data

US 2009/0000896 A1  Jan. 1, 2009

(51) Int. Cl.
| | |
|---|---|
| F16D 25/0638 | (2006.01) |
| F16D 25/10 | (2006.01) |
| B60K 6/405 | (2007.10) |
| B60K 6/485 | (2007.10) |
| B60K 6/387 | (2007.10) |
| F16H 3/00 | (2006.01) |
| F16D 21/06 | (2006.01) |
| F16H 57/04 | (2010.01) |

(52) U.S. Cl.
CPC ............. *B60K 6/387* (2013.01); *F16H 3/006* (2013.01); *B60K 6/405* (2013.01); *F16D 25/10* (2013.01); *F16D 25/0638* (2013.01); *B60Y 2400/428* (2013.01); *F16D 2021/0661* (2013.01); *B60K 6/485* (2013.01); *F16H 57/0476* (2013.01); *Y02T 10/6226* (2013.01); *Y10S 903/914* (2013.01); *Y10S 903/952* (2013.01)

USPC ................ 192/48.611; 192/55.61; 192/70.12; 903/914; 903/952

(58) Field of Classification Search
USPC ............................................... 192/48.8, 48.91
See application file for complete search history.

(56) References Cited

U.S. PATENT DOCUMENTS

| | | | |
|---|---|---|---|
| 6,008,545 A | 12/1999 | Nagano et al. | |
| 6,258,001 B1 | 7/2001 | Wakuta et al. | |
| 6,340,339 B1 | 1/2002 | Tabata et al. | |
| 6,478,101 B1 | 11/2002 | Taniguchi et al. | |
| 6,612,963 B2 | 9/2003 | Minowa et al. | |
| 6,736,228 B2 | 5/2004 | Donohue et al. | |
| 6,935,450 B1 | 8/2005 | Tsuzuki et al. | |
| 7,484,607 B2 * | 2/2009 | Schneider et al. | 192/55.61 |
| 7,631,739 B2 * | 12/2009 | Enstrom | 192/48.609 |
| 2004/0206599 A1 * | 10/2004 | Hegerath | 192/87.11 |
| 2006/0144665 A1 * | 7/2006 | Janson et al. | 192/48.8 |
| 2007/0175726 A1 * | 8/2007 | Combes et al. | 192/87.11 |

* cited by examiner

*Primary Examiner* — Troy Chambers
*Assistant Examiner* — Ryan Dodd
(74) *Attorney, Agent, or Firm* — James Dottavio; MacMillan, Sobanksi & Todd, LLC

(57) ABSTRACT

An apparatus for transmitting power to a transmission input includes first and second sources of rotary power, first and second transmission input shafts, a clutch hub driveably connected to the first and second power sources, and first and second clutches secured to the clutch hub, for alternately closing and opening a drive connection between the first and second transmission input shafts and the clutch hub.

16 Claims, 3 Drawing Sheets

INTEGRATED STARTER GENERATOR AND INPUT CLUTCH ASSEMBLY FOR HYBRID ELECTRIC VEHICLE

BACKGROUND OF THE INVENTION

1. Field of the Invention

The present invention relates generally to an assembly for transmitting rotating power produced by two power sources to an automotive power transmission. In particular, it pertains to an assembly for connecting the power sources through two input clutches to a powershift transmission.

2. Description of the Prior Art

Hybrid vehicle drive trains generally have two power sources, a conventional internal combustion engine, and an alternate power source, such as an electric machine, and a power transmission device. In city driving where the vehicle continuously stops and starts, the electric machine is used as a motor to start the engine and as a generator to recover kinetic energy during braking. The internal combustion engine is most suitable in highway driving, during which wheel braking and opportunities for energy recovery are infrequent, and the engine operates at its greatest efficiency.

In mixed driving conditions, the electric machine and combustion engine may be used together to transmit power to a transmission input shaft, depending on driving conditions and the magnitude of reserve battery capacity.

Integration of an electric machine into a power transmission device, specifically an automatic powershift transmission with two input clutches, which results in a compact assembly making efficient use of radial and axial dimensions that is also robustly supported and easily installed, is a desirable need in the industry.

SUMMARY OF THE INVENTION

An apparatus for transmitting power to a transmission input includes first and second sources of rotary power, first and second transmission input shafts, a clutch hub driveably connected to the first and second power sources, and first and second clutches secured to the clutch hub, for alternately closing and opening a drive connection between the first and second transmission input shafts and the clutch hub.

The arrangement of the elements in the apparatus is compact and has short axial length while providing robust support for centering the stator and rotor of the electric machine with high precision to improve its efficiency.

The first and second clutch are located axially forward of the clutch housing wall. A header provides support and limits excitation of the high voltage connection and is located axially forward of the clutch housing wall and radially outside the first and second clutch. The stator and rotor of the electric machine are located axially forward of the header and radially outside the first and second clutch. A rotor hub provides support for the rotor of the electric machine and is located axially forward of the first and second clutch and incorporates a resolver rotor. The adapter housing wall provides support for the rotor hub and is located axially forward of the rotor hub and incorporates a resolver stator. The damper/flywheel assembly is located axially forward of the adapter housing wall.

The arrangement of the elements in the apparatus also facilitates its easy assembly and installation. The strategic integration of the dual clutch assembly and the rotor hub assembly via a bolted joint interface allows the integrated assembly to be installed where the front support provides radial alignment and support during installation. The damper/flywheel assembly is attached to an engine separate from the rest of the apparatus which facilitates the hybrid drive train installation to be similar to a conventional manual transmission or powershift transmission installation to an engine.

The adapter housing functions as a sealing wall to separate the wet environment of the dual clutch assembly and stator and rotor of the electric machine from the dry environment of the damper/flywheel assembly.

The adapter housing flange can be easily modified to accommodate mating to various engines, which achieves the objective of a very portable overall design that does not require significant changes to the base apparatus. The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
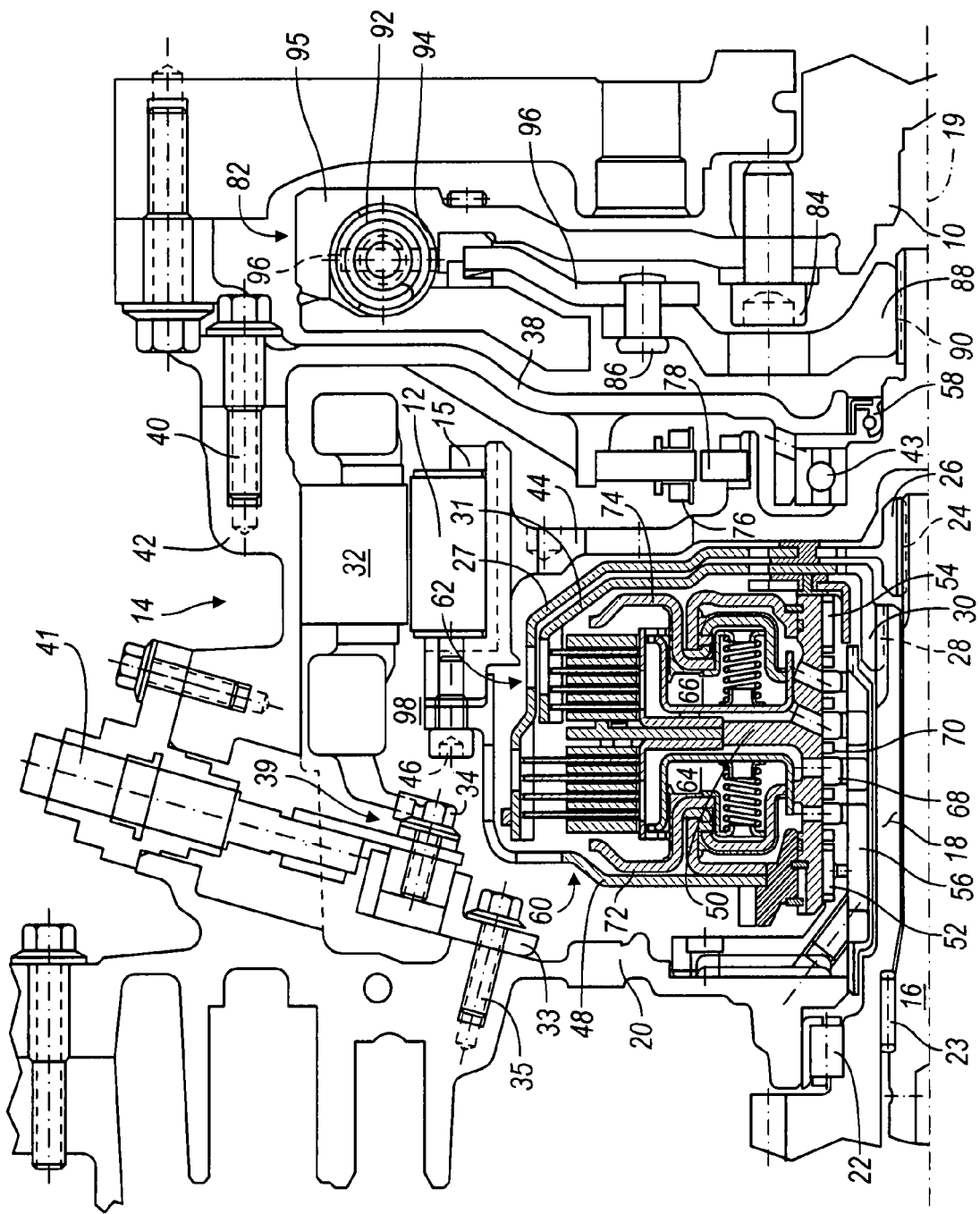
FIG. 1 is a cross sectional view showing the arrangement of the elements in the apparatus, including the high voltage connection, for driveably connecting an engine and an electric machine through two clutches to two transmission input shafts.
Figure 3:
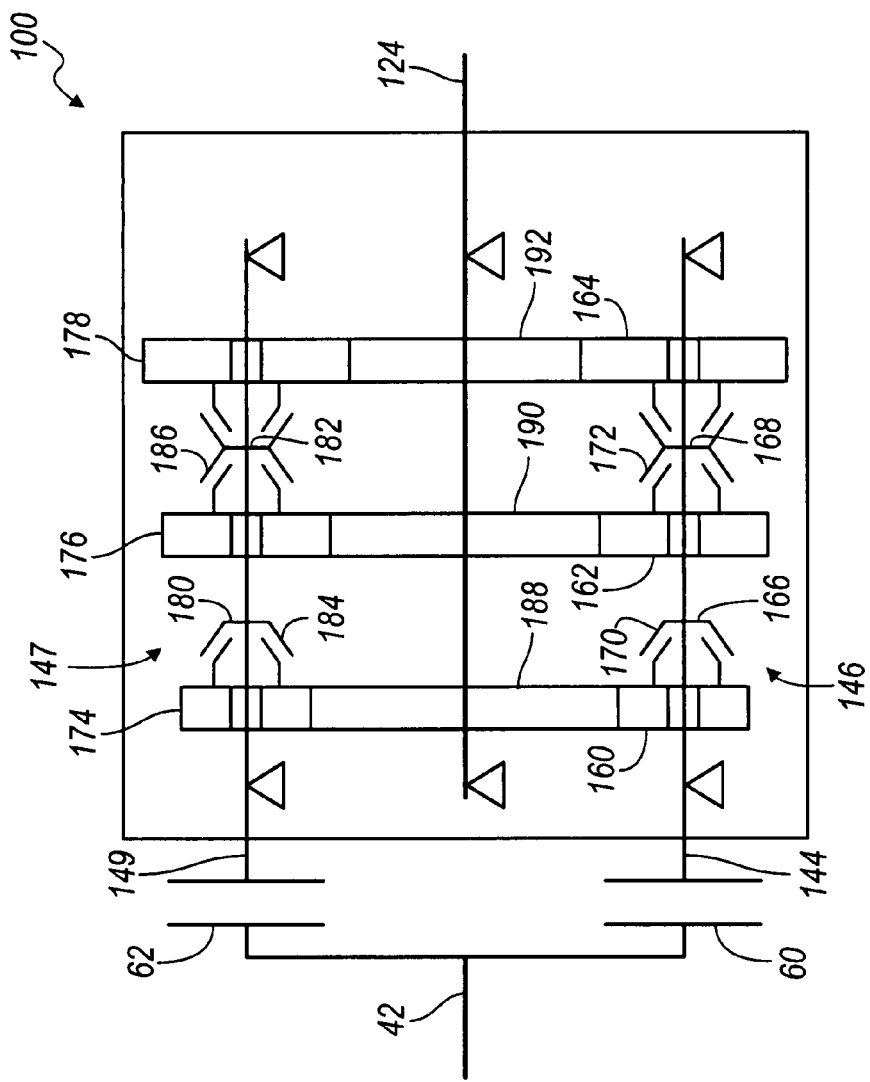
FIG. 3 is a schematic diagram of a powershift transmission.

Referring first to FIG. 1, a power shaft 10, such as the crankshaft of an internal combustion engine, the shaft of a hydraulic motor, or the shaft of an electric motor, and the rotor 12 of an electric machine 14, such as an integrated starter generator or motor, are driveably connected to, and disconnected from the input shafts 16, 18 of a power transmission device, such as a powershift transmission. The wheels of a motor vehicle are driveably connected alternately to the input shafts 16, 18 through the transmission, which can produce multiple stepped ratios of the speed of its input and output, as described below with reference to FIG. 3. Power shaft 10, rotor 12 and input shafts 16, 18 rotate about an axis 19.

A clutch housing 20 supports input shaft 18 on a bearing 22, and a needle bearing 23 supports input shaft 16 on the inner surface of input shaft 18. Input shaft 16 is connected at spline 24 to the hub 26 of a first clutch output cylinder 27, and input shaft 18 is connected at spline 28 to the hub 30 of a second clutch output cylinder 31.

The stator 32 of the electric machine 14 is secured by bolts 36 to the clutch housing 20. An adapter housing 38 is secured by bolts 40 to an integral flange 42 of the clutch housing 20. A header 33, secured by bolts 35 to clutch housing 20, supports and limits excitation of the high voltage connection 39 made when bolts 34 tightly secure the overlying terminals of stator 32 and connector 41 to header 33. The rotor 12 is secured to the rotor hub 44 with a pressed ring 15. The rotor hub 44 is supported by a bearing 43 on the adapter housing 38. The rearward end of rotor hub 44 is connected by bolts 46 to an input cylinder 48, which is secured to a clutch hub 50, such that rotor hub 44, rotor 12, input cylinder 48, and clutch hub 50 rotate as a unit.

Needle bearings 52, 54 support the clutch hub 50 on a front support 56, which is secured to clutch housing 20. A lip seal 58, located between the adapter housing 38 and rotor hub 44, provides a seal between the wet environment, where first and second hydraulically-actuated clutches, 60, 62 are located, and the dry environment, where the damper/flywheel assembly 82 and the power shaft 10 are located.

The dual clutch assembly that includes clutches, 60, 62 transmits torque from power shaft 10 and torque from rotor 12 alternately to the input shafts 16, 18 depending on the engaged and disengaged state of the clutches 60, 62. Clutches 60, 62 each include respective pressure balance dam volumes 64, 66 containing hydraulic fluid, which volumes correct for the effect of centrifugal force on the magnitude of hydraulic pressure in the clutch actuation cylinders.

Front support 56 is formed with four axially spaced and radially directed fluid passages 68, separated by five seals 70. The passages 68, which pass through the thickness of the front support 56 and continue through the clutch hub 50, provides lines through which hydraulic apply pressure is communicated to the apply side of the servo piston 72 of clutch 60, to the apply side of the servo piston 74 of clutch 62, and to the balance dams 64, 66.

A resolver stator 76, located radially inward on a cylindrical flange of the adapter housing 38, and resolver rotor 78, located radially outward on a cylindrical flange of the rotor hub 44, produce electronic signals representing the rotational speed and angular position of the rotor 12.

The adapter housing 38 and lip seal 58 hydraulically and physically separate the dual clutch assembly from a damper/flywheel assembly 82 and the rest of the engine compartment. The damper/flywheel assembly 82 is secured at its input side by bolts 84 to the power shaft 10 and is connected at its output side by a spline 90 to rotor hub 44. The damper/flywheel assembly 82 contains compression springs 92 arranged mutually in parallel and located in an annular damper recess 94 formed in a damper housing 95. The springs 92 are actuated by rotational displacement of the power shaft 10 relative to the rotor hub 44, causing the springs to compress and expand relative to a drive plate 96, which is connected by rivets 86 to a drive hub 88. Expansion and contraction of the springs attenuates torsional displacement and transient vibrations transmitted to rotor hub 44 from power shaft 10. In this way, the damper/flywheel assembly 82 transmits input torque from power shaft 10 to the dual clutch assembly.

The damper/flywheel assembly 82 is located outside a chamber 98 that is sealed and bounded by lip seal 58, clutch housing 20, the integral flange 42 of the clutch housing 20, and adapter housing 38. The location of the damper/flywheel assembly 82 makes efficient use of the space provided, and, although the sealed volume of chamber 98 is located close to the damper/flywheel assembly 82, chamber 98 is hydraulically isolated from it.

The arrangement of the elements in the apparatus shown in FIG. 1 is assembled in steps beginning with the clutch housing 20. Then the base transmission which includes the input shafts 16, 18 along with the needle bearing 23 and bearing 22 is assembled into the clutch housing 20. Next, the header 33 and connector 41 are bolted to clutch housing 20. The stator 32 is then secured by bolts 36 to the clutch housing 20. The high voltage connection 39 is then made by tightly securing the overlying terminals of the stator 32 and connector 41 to the header 33 with bolts 34. The front support 56 which includes needle bearings 52, 54 and seals 70 is then inserted and secured to the clutch housing 20. Next, an integrated assembly connected by bolts 46 that includes the dual clutch assembly (containing the clutches 60, 62, clutch hub 56, input cylinder 48, and output cylinders 27, 31) and the rotor hub assembly (containing the rotor hub 44, bearing 43, rotor 12, and resolver rotor 78) is inserted over the front support 56, such that clutch cylinder hubs 26 and 30 engage splines 24 and 28, respectively. Then the adapter housing 38 which includes the lip seal 58 and the resolver stator 76 is installed and connected by bolts 40 to the integral flange 42 of the clutch housing 20. Then the damper/flywheel assembly 82 is connected by bolts 84 to the power shaft 10 of the engine. Finally, the hybrid drive train assembly is completed by installing the engine to the adapter housing 38, such that the drive hub 88 of the damper/flywheel assembly 82 engages the rotor hub 44 at spline 90, and securing the engine to the adapter housing 38 with bolts.

Figure 2:
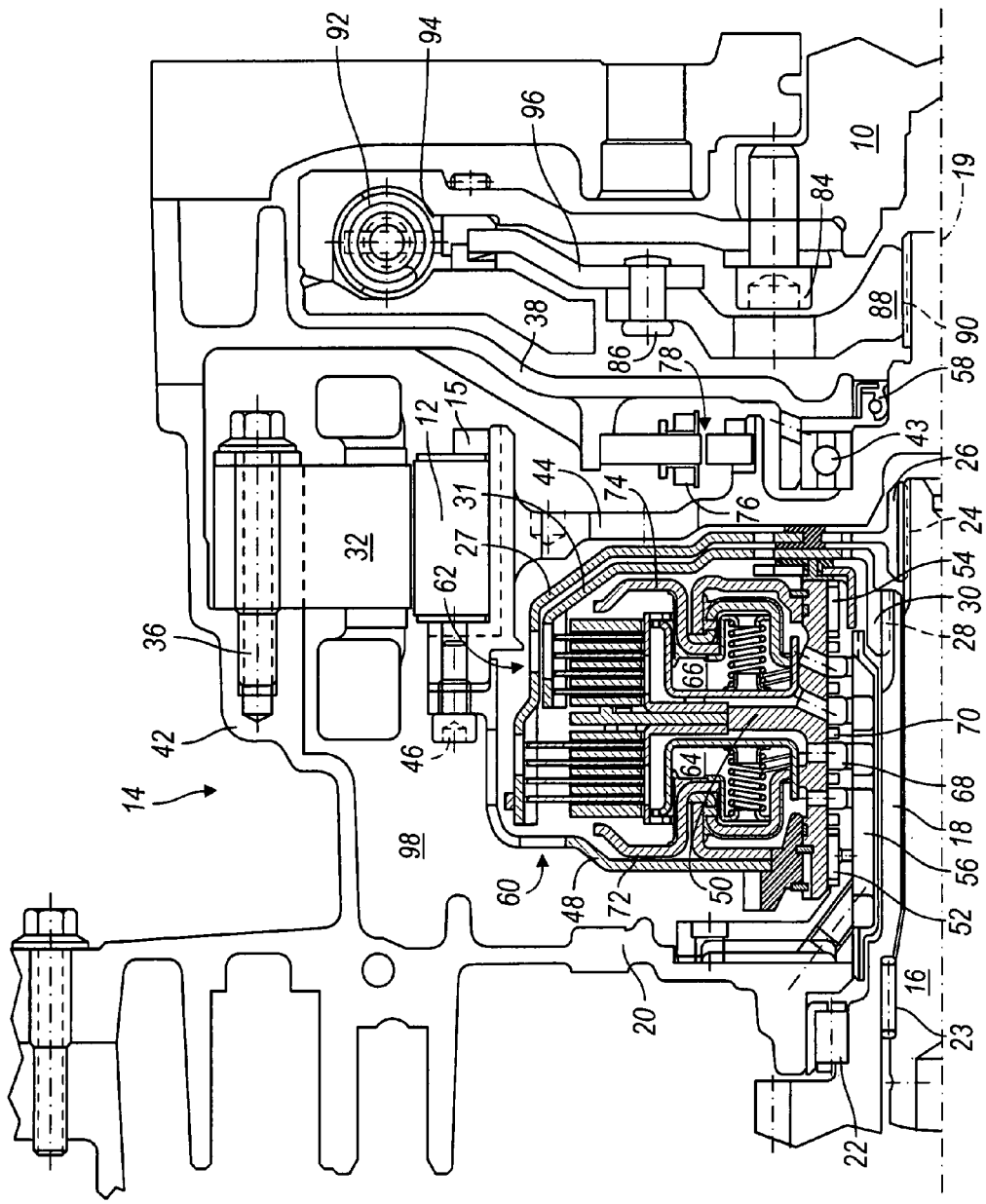
FIG. 2 is a cross sectional view similar to FIG. 1 except that the method of attaching the stator of the electric machine is shown instead of the high voltage connection.

FIG. 2 illustrates details of a powershift transmission 100, which includes the first input clutch 60 for selectively connecting rotor hub 42 alternately to even-numbered gears 146 associated with a first layshaft 144, and the second input clutch 62, which selectively connects rotor hub 42 alternately to odd-numbered gears 147 associated with a second layshaft 149.

Shaft 144 supports pinions 160, 162, 164, which are each journalled on shaft 144, and couplers 166, 168, which are secured to shaft 144. Pinions 160, 162, 164 are associated respectively with the second, fourth and sixth gears. Coupler 166 includes a sleeve 170, which can be moved leftward to engage pinion 160 and driveably connect pinion 160 to shaft 144. Coupler 168 includes a sleeve 172, which can be moved leftward to engage pinion 162 and driveably connect pinion 162 to shaft 144 and can be moved rightward to engage pinion 164 and driveably connect pinion 164 to shaft 144.

Shaft 149 supports pinions 174, 176, 178, which are each journalled on shaft 149, and couplers 180, 182, which are secured to shaft 149. Pinions 174, 176, 178 are associated respectively with the first, third and fifth gears. Coupler 180 includes a sleeve 184, which can be moved leftward to engage pinion 174 and driveably connect pinion 174 to shaft 149. Coupler 182 includes a sleeve 186, which can be moved leftward to engage pinion 176 and driveably connect pinion 176 to shaft 149 and can be moved rightward to engage pinion 178 and driveably connect pinion 178 to shaft 149.

Output 124 supports gears 188, 190, 192, which are each secured to shaft 124. Gear 188 meshes with pinions 160 and 174. Gear 190 meshes with pinions 162 and 176. Gear 192 meshes with pinions 164 and 178. Couplers 166, 168, 180 and 182 may be synchronizers, or dog clutches or a combination of these.

Although operation of the transmission 100 is described with reference to forward drive only, the transmission can produce reverse drive by incorporating a reverse idler gear in one of the lower power paths and a reverse coupler for engaging reverse drive. One of the input clutches 60, 62 would be engaged when reverse drive operation is selected.

The arrangement of elements in the apparatus is compact and has short axial length while providing robust support for centering the stator 32 and rotor 12 of the electric machine 14 with high precision to improve its efficiency. The clutches 60, 62 are located axially forward of a rear wall of clutch housing 20. A header 33 provides support and limits excitation of the high voltage connection 39 and is located axially forward of the rear wall of the clutch housing 20 and radially outside the clutches 60, 62. The stator 32 and rotor 12 of the electric machine 14 are located axially forward of the header 33 and radially outside the clutches 60, 62. The substantially aligned radial position of the header 33 and the electric machine 14 with the clutches 60, 62 reduces the axial length of the apparatus and facilitates cooling of the electric machine 14 and the high voltage connection 39. A rotor hub 44 provides support for the rotor 12 of the electric machine 14 and is located axially forward of the clutches 60, 62 and incorporates a resolver rotor 78, which is located axially forward of the rotor hub 44. The adapter housing 38 provides support for the rotor hub 44 through a bearing 43 which is located axially forward of the rotor hub 44 and radially inward of the resolver rotor 78. The adapter housing 38 is located axially forward of the rotor hub 44 and incorporates a resolver stator 76, which is located axially rearward of the wall of the adapter housing 38. The substantially aligned radial position of the bearing 43 with the resolver rotor 78 and the resolver stator 76 reduces the axial length of the apparatus. The lip seal 58 prevents leakage of hydraulic fluid from the chamber 98 and is located axially forward of the bearing 43 and radially inward from the wall of the adapter housing 38. The damper/flywheel assembly 82 is located axially forward of the wall of the adapter housing 38.

The arrangement of the elements in the apparatus also facilitates its easy assembly and installation. The strategic integration of the dual clutch assembly and rotor hub assembly via a bolted joint interface allows the integrated assembly to be installed where the front support 56 provides radial alignment and support during installation. The damper/flywheel assembly 82 is attached to an engine separate from the rest of the apparatus which facilitates the hybrid drive train installation to be similar to a conventional manual transmission or powershift transmission installation to an engine.

The adapter housing 38 functions as a sealing wall to separate the wet environment of the dual clutch assembly and electric machine 14 from the dry environment of the damper/flywheel assembly 82. This arrangement allows the apparatus to be fully tested prior to final installation with an engine.

The flange of the adapter housing 38 can be easily modified to accommodate mating various engines, which makes the overall design very portable and does not require significant changes to the base apparatus.

In accordance with the provisions of the patent statutes, the preferred embodiment has been described. However, it should be noted that the alternate embodiments can be practiced otherwise than as specifically illustrated and described.

What is claimed is:

1. A drive apparatus, comprising:
first and second power sources;
first and second transmission input shafts;
a hub secured to the power sources, and supported on bearings at opposite axial ends thereof;
a first clutch connecting the first input shaft and the hub;
a second clutch connecting the second input shaft and the hub;
a sealed chamber containing the clutches, the hub and one of the power sources.

2. The apparatus of claim 1, further comprising:
a damper including an input secured to the first power source, an output driveably connected to the second power source and the hub, and compression springs elastically interconnecting the input and output, for attenuating torsional vibrations transmitted by the first power source.

3. The apparatus of claim 1, wherein:
the first power source is a power shaft; and
the second power source is an electric machine.

4. The apparatus of claim 1, wherein the chamber comprises:

a clutch housing located at a first axial side of the first clutch and the second clutch and extending radially outward from an axis;
an adapter housing located at a second axial side of the first clutch and the second clutch and extending radially outward from the axis;
a flange of the clutch housing connected to the adapter housing power source; and
a hydraulic seal contacting the adapter housing, for preventing leakage of hydraulic fluid from the chamber.

5. The apparatus of claim 4, further comprising:
a resolver located in the chamber; and
a header located in the chamber and secured to the clutch housing, for supporting a high voltage connection.

6. The apparatus of claim 1, wherein the second power source is an electric machine including a rotor, the hub further comprising:
a rotor hub driveably connected to the first power source;
an input cylinder secured to the hub; and
an attachment for releasably connecting the rotor hub and the input cylinder.

7. The apparatus of claim 1, wherein:
the first clutch further includes a first output cylinder driveably connected to the first transmission input shaft, a first member driveably connected to the hub, first friction discs secured to the first output cylinder, first clutch plates interleaved with the first friction discs and secured to the first member, and a first hydraulically-actuated piston for alternately releasing and mutually frictionally engaging the first friction discs and the first clutch plates; and
the second clutch further includes a second output cylinder driveably connected to the second transmission input shaft, a second member driveably connected to the hub, second friction discs secured to the second output cylinder, second clutch plates interleaved with the second friction discs and secured to the second member, and a second hydraulically-actuated piston for alternately releasing and mutually frictionally engaging the second friction discs and the second clutch plates.

8. A drive apparatus, comprising:
an engine;
an electric machine including a rotor;
first and second transmission input shafts;
a hub secured to the engine and rotor, and supported on bearings at opposite axial ends thereof;
a first clutch connecting the first input shaft and the hub;
a second clutch connecting the second input shaft and the hub;
a sealed chamber containing the clutches, the hub and the electric machine.

9. The apparatus of claim 8, further comprising:
a damper assembly including an input secured to the engine, an output driveably connected to the hub, and compression springs elastically interconnecting the input and the output, for attenuating torsional vibrations transmitted by the engine.

10. The apparatus of claim 8, wherein:
the electric machine comprises a stator and the rotor.

11. The apparatus of claim 8, wherein the chamber comprises:
a clutch housing located at a first axial side of the first clutch and the second clutch and extending radially outward from an axis;
an adapter housing located at a second axial side of the first clutch and the second clutch and extending radially outward from the axis;

a flange of the clutch housing connected to the adapter housing; and a hydraulic seal contacting the adapter housing, for preventing leakage of hydraulic fluid from the chamber.

12. The apparatus of claim 11, further comprising:

a resolver located in the chamber; and a header located in the chamber and secured to the clutch housing, for supporting a high voltage connection.

13. The apparatus of claim 8, wherein the hub further comprises:

a clutch hub driveably connected to the power shaft and the rotor;

a rotor hub driveably connected to the engine and the rotor;

an input cylinder secured to the hub; and an attachment for releasably connecting the rotor hub and the input cylinder.

14. The apparatus of claim 8, further comprising a clutch hub driveably connected to the engine and the rotor; and wherein:

the first clutch further includes a first output cylinder driveably connected to the first transmission input shaft, a first member driveably connected to the clutch hub, first friction discs secured to the first output cylinder, first clutch plates interleaved with the first friction discs and secured to the first member, and a first hydraulically-actuated piston for alternately releasing and mutually frictionally engaging the first friction discs and the first clutch plates; and the second clutch further includes a second output cylinder driveably connected to the second transmission input shaft, a second member driveably connected to the hub, second friction discs secured to the second output cylinder, second clutch plates interleaved with the second friction discs and secured to the second member, and a second hydraulically-actuated piston for alternately releasing and mutually frictionally engaging the second friction discs and the second clutch plates.

15. A drive apparatus, comprising:

an engine;

an electric machine;

first and second transmission input shafts;

a hub supported on bearings, driveably connected to the electric machine and to the engine;

a first clutch connecting the first input shaft and the hub;

a second clutch connecting the second input shaft and the hub;

further comprising:

a damper located outside a sealed chamber containing the clutch, the hub and the electric machine, and including an input secured to the engine, an output driveably connected to the hub, and compression springs elastically interconnecting the input and the output, for attenuating torsional vibrations transmitted by the engine.

16. A drive apparatus, comprising:

an engine;

an electric machine;

first and second transmission input shafts;

a hub supported on bearings, driveably connected to the electric machine and to the engine;

a first clutch connecting the first input shaft and the hub;

a second clutch connecting the second input shaft and the hub;

further comprising:

a clutch housing located at a first axial side of the first clutch and the second clutch, and including a wall that extends radially outward from the axis and forms a boundary of a sealed chamber;

an adapter housing located at a second axial side of the first clutch and the second clutch, and including a second wall that extends radially outward from the axis and forms a second boundary of the chamber;

a flange of the clutch housing connected to the adapter housing and forming a third boundary of the chamber.

* * * * *